(12) United States Patent
Suzuki et al.

(10) Patent No.: US 6,749,311 B2
(45) Date of Patent: Jun. 15, 2004

(54) SPREAD ILLUMINATING APPARATUS WITH WEDGE-SHAPED LIGHT CONDUCTIVE BAR

(75) Inventors: Shingo Suzuki, Iwata-gun (JP); Toru Kunimochi, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/227,251

(22) Filed: Aug. 26, 2002

(65) Prior Publication Data

US 2003/0043568 A1 Mar. 6, 2003

(30) Foreign Application Priority Data

Aug. 28, 2001 (JP) .................................... 2001-257768

(51) Int. Cl.[7] ................................................ F21V 7/04
(52) U.S. Cl. ..................... 362/31; 362/331; 362/326; 362/27
(58) Field of Search ............................ 362/26, 27, 31, 362/326, 330, 331; 349/58, 65

(56) References Cited

U.S. PATENT DOCUMENTS 5,894,539 A    4/1999    Epstein ..................... 385/133
6,561,662 B2 *  5/2003   Egawa ....................... 362/27

FOREIGN PATENT DOCUMENTS

JP    A 2001-57106     2/2001
JP    A 2002-216526    8/2002

* cited by examiner

Primary Examiner—Sandra O'Shea
Assistant Examiner—Ali Alavi
(74) Attorney, Agent, or Firm—Oliff & Berridge, PLC

(57) ABSTRACT

A light conductive bar has a plurality of flat portions parallel to a side surface thereof facing a light conductive plate and formed on a side surface thereof opposite to the side surface and a plurality of inclined surfaces descending from one end surface facing a spot-like light source toward the other end surface, wherein the flat portions step down gradually from the one end surface to the other end surface. When light introduced into the light conductive bar from the one end surface is repeatedly reflected at the flat portions and the side surface facing the light conductive plate, angles of reflections thereat can stay larger than the critical angle because the flat portions are parallel to the side surface. Accordingly, the light can travel to the other end surface without leakage, thereby improving the luminance of the apparatus.

17 Claims, 9 Drawing Sheets

$(\alpha + \beta) < 180°$ $|\theta_1 - \theta_2| \leq 2$

SPREAD ILLUMINATING APPARATUS WITH WEDGE-SHAPED LIGHT CONDUCTIVE BAR

BACKGROUND OF THE INVENTION

1. Field of the Invention

The present invention relates to a spread illuminating apparatus, and more particularly to a spread illuminating apparatus used as an illuminating means for a liquid crystal display device.

2. Description of the Related Art

A liquid crystal display (hereinafter, referred to as "LCD") featuring low power consumption, low profile and light weight has been extensively used in electric products including cellular phones and personal computers.

However, since a liquid crystal, which is a structural element of the LCD, does not emit light by it self unlike a light emitting element such as a CRT, the LCD requires a separate illuminating means in order to observe an image. Recently, to satisfy the demand for downsizing and energy saving, a sheet-like spread illuminating apparatus of side light type (light conductive plate type) is often used.

An example of a spread illuminating apparatus of side light type is shown in FIG. 9.

In FIG. 9, a spread illuminating apparatus 1 is generally constituted such that a lamp 4 is disposed along and close to an end surface 3 of a light conductive plate 2 made of a light-transmissible material. The light conductive plate 2 is shaped rectangular and has a light reflection pattern 5 formed on a major surface thereof.

The lamp 4 is generally composed of a light conductive bar 6 shaped like a slim-rectangular-prism, made of a transparent material and arranged with a surface 6a along and close to the end surface 3 of the light conductive plate 2, and a spot-like light source 7 arranged to face an end surface of the light conductive bar 6.

The light conductive bar 6 has an optical path conversion means 8 formed on a side surface 6b thereof opposite to the side surface 6a facing the end surface 3 of the light conductive plate 2. The optical path conversion means 8 comprises a plurality of grooves 9, for example, triangular in section, extending in a direction of thickness of the light conductive bar 6, and arrayed in a longitudinal direction of the light conductive bar 6 (hereinafter, referred to as "stair-like type") and makes light emitted from the spot-like light source 7 incident in a substantially uniform manner on the end surface 3 of the light conductive plate 2. In order to make the light to uniform, the triangular grooves 9 have their depths gradually increased in proportion to an increase in the distance from the spot-like light source 7.

Also, the spread illuminating apparatus 1 includes a frame 10 substantially U-shaped in section, having a predetermined width L1 and having a light reflection member (not shown) on its inner surface, and covers longitudinal surfaces of the light conductive bar 6 except the side surface 6a facing the light conductive plate 2, and an end portion (two surfaces toward the end surface 3 of the light conductive plate 2), thereby recovering light leaking from the light conductive bar 6 to improve the usability of the light.

The frame 10 is adapted also to securely hold together the light conductive bar 6 and the light conductive plate 2 with a predetermined strength.

Recently, the above-described spread illuminating apparatus is strongly demanded to have as large a liquid crystal screen area as possible. Accordingly, the frame is requested to have its portion minimized which covers the liquid crystal screen, and to meet this request in a compact configuration.

In the prior art shown in FIG. 9, if the width L1 of the frame 10 is decreased to comply with the above request, the covered area at the light conductive plate 2 is reduced making it difficult to securely hold together the light conductive bar 6 and the light conductive plate 2.

Under the circumstances, the present applicants have proposed a spread illuminating apparatus in Japanese Patent Application 2001-8966, in which the covered portion over the liquid crystal screen is minimized and the light conductive bar and the light conductive plate are strongly held together, while miniaturization is achieved. A spread illuminating apparatus 1A proposed in the above application includes a light conductive bar 20 and a light conductive plate 21 as shown in FIG. 10. The light conductive bar 20 is wedge-shaped and has a larger end surface 20a facing a spot-like light source 7. The light conductive plate 21 has an inclination angle (inclination angle on a light conductive plate) β, which is an obtuse angle formed between an end surface 21 of the light conductive plate 21a facing the light conductive bar 20 and a side surface 21b thereof flush with the end surface 20a facing the spot-like light source 7. The light conductive bar 20 has an inclination angle (inclination angle of the light conductive bar) α, which is an acute angle formed between a side surface 20b of the light conductive bar 20 facing the light conductive plate 21 and the surface 20a facing the spot-like light source 7.

In the apparatus shown in FIG. 10, when the light conductive plate 21 and the light conductive bar 20 are held together by the frame 10 (see FIG. 9), since the light conductive bar 20 is wedge-shaped, the frame 10 has a sufficiently large area to cover the light conductive plate 21 toward an end surface 20c of the light conductive bar 20 opposite to the end surface 20a facing the spot-like light source 7. Therefore, even when the width of the frame 10 is decreased, the frame 10 retains a sufficient strength to hold together the light conductive bar 20 and the light conductive plate 21, whereby the apparatus can be successfully downsized with an increased liquid crystal screen.

The optical path conversion means formed on the light conductive bar may comprise a plurality of grooves 20e and a plurality of flat portions 20f each connecting adjacent grooves 20e as shown in FIG. 11 rather than the stair-like type shown in FIG. 10.

However, in the prior art shown in FIGS. 9 to 11, the side surface 20b of the light conductive bar 6 facing the light conductive plate 21 and a side surface 20d opposite to the surface 20b come closer to each other as approaching the end surface 20c which is smaller than the end surface 20a. Therefore, when light introduced into the light conductive bar 20 through the end surface 20a travels toward the end surface 20c while repeating reflection at the side surface 20b and the side surface 20d (flat portions 20f), the angle of reflection decreases at each reflection, becomes smaller than the critical angle before the light reaches the end surface 20c, and exits out (leakage light) from the side surface 20b as shown in FIG. 12. In other words, the light introduced into the light conductive bar 20 from the surface 20a cannot sufficiently travel up to the end surface 20c, that is, the light cannot be sufficiently kept in the light conductive bar 20, thereby decreasing the luminance of the spread illuminating apparatus. This is also the case with the light conductive bar with the optical path conversion means of stair-like type.

In this connection, the present applicants proposed a spread illuminating apparatus, in which a plurality of wedge-shaped light conductive bars are arranged in parallel along the end surface of the light conductive plate in Japanese Patent Application No. 11-232652 (Japanese Unexamined Patent Application publication No. 2001-57106).

This spread illuminating apparatus still has the same problem as the prior art shown in FIG. 12 in that the leakage light is generated.

A spread illuminating apparatus with a wedge-shaped light conductive bar capable of forwarding light all the way up from one end surface to the other end surface thereof (keeping light therein) is disclosed in U.S. Pat. No. 5,894,539. The spread illuminating apparatus generally includes a wedge-shaped light conductive bar 20B as shown in FIG. 13. The light conductive bar 20B has a plurality of flat portions 25 stepped from one another and parallel to a side surface 20b facing a light conductive plate.

In the apparatus shown in FIG. 13, since the side surface 20b facing the transparent substrate is parallel to each of the flat portions 25, the reflection angles formed by the surface 20b and the flat portions 25 larger than the critical angle, thereby improving the luminance of the apparatus.

In the apparatus shown in FIG. 13, in which the light conductive bar 20B is arranged with the side surface 20b facing the transparent substrate (not shown), the light conductive bar 20B has a large end surface 20a, which makes a side surface 20d opposite to the side surface 20b positioned far apart from the light conductive plate thereby preventing a miniaturization of the apparatus. Also, when the light conductive bar 20B and the light conductive plate are to be held together by the frame 10 (see FIG. 9), the width of the frame 10 has to be large enough to cover the dimension equal to the end surface 20a and the end portion of the light conductive plate. This increases the size of the frame 10, resulting in an increased size of the whole apparatus.

SUMMARY OF THE INVENTION

The present invention has been made in the light of the above, and its object is to provide a downsized spread illuminating apparatus capable of reducing leakage light.

A spread illuminating apparatus according to a first aspect of the present invention comprises a quadrangular light conductive plate made of a light-transmissible material and a lamp having a light conductive bar made of a transparent material and arranged along an end surface of the light conductive plate, a spot-like light source arranged at an end surface of the light conductive bar. In the apparatus, the light conductive plate has an inclination angle, which is an obtuse angle formed by an end surface facing the light conductive bar with respect to a side surface flush with the end surface of the light conductive bar, the light conductive bar is wedge-shaped, has a large thickness toward the end surface and a small thickness toward the other end surface, and has an inclination angle, which is an acute angle formed by a side surface facing the light conductive plate with respect to the end surface, and a plurality of flat portions substantially parallel to the side surface facing the light conductive plate are formed on a side surface of the light conductive bar opposite to the side surface facing the light conductive plate, are connected to one another via each of a plurality of inclined surfaces descending toward the other end surface, and gradually step down with respect to the side surface facing the light conductive plate from the end surface toward the other end surface, thereby forming a stair-like configuration.

A spread illuminating apparatus according to a second aspect of the present invention comprises a quadrangular light conductive plate made of a light-transmissible material and a lamp having a light conductive bar made of a transparent material and arranged along an end surface of the light conductive plate, and a spot-like light source arranged at an end surface of the light conductive bar. In the apparatus, the light conductive plate has an inclination angle, which is an obtuse angle formed by the end surface facing the light conductive bar with respect to side surface flush with the end surface of the light conductive bar, and the light conductive bar is wedge-shaped, has a large thickness toward the end surface and a small thickness toward the other end surface opposite to the end surface, has an inclination angle, which is an acute angle formed by a side surface facing the light conductive plate with respect to the end surface, and has a plurality of grooves and a plurality of flat portions formed on a side surface thereof opposite to the side surface facing the light conductive plate, such that the flat portions are substantially parallel to the side surface facing the light conductive plate and each connect adjacent grooves.

According to a third aspect of the present invention, in the spread illuminating apparatus of the first or second aspect, an absolute value of a difference between an angle formed by the side surface of the light conductive bar facing the light conductive plate to a predetermined reference plane and an angle formed by the flat portions to the reference plane is 2° or less, more preferably 1° or less.

According to a fourth aspect of the present invention, in the spread illuminating apparatus of the first or second aspect, an angle formed by the side surface of the light conductive bar facing the light conductive plate with respect to the end surface is supplementary to the inclination angle of the light conductive plate.

A spread illuminating apparatus according to a fifth aspect of the present invention comprises a quadrangular light conductive plate made of a light-transmissible material, and a plurality of lamps each having a light conductive bar made of a transparent material and arranged in parallel along an end surface of the light conductive plate, and a spot-like light source arranged at an end surface of the light conductive bar. In the apparatus, each of a plurality of light conductive bars is wedge-shaped, has a large thickness toward the end surface and a small thickness toward the other end surface opposite to the end surface, and has an optical path conversion means formed on a side surface thereof opposite to the side surface facing the light conductive plate, an optical path conversion means of one light conductive bar disposed farthest from the light conductive plate is formed such that a plurality of flat portions substantially parallel to the side surface facing the light conductive plate are connected to one another via each of a plurality of inclined surfaces descending toward the other end surface so that the plurality of flat portions gradually step down with respect to the side surface facing the light conductive plate from the end surface toward the other end surface, thereby forming a stair-like configuration, and the shape combining the plurality of light conductive bars and the light conductive plate is generally rectangular.

A spread illuminating apparatus according to a sixth aspect of the present invention comprises a quadrangular made of a light-transmissible material and a plurality of lamps each having a light conductive bar made of a transparent material and arranged in parallel along an end surface of the light conductive plate, and a spot-like light source arranged at an end surface of the light conductive bar. In the apparatus, each of the plurality of light conductive bars is wedge-shaped, has a large thickness toward the end surface and a small thickness toward the other end surface opposite to the end surface, and has an optical path conversion means formed on a side surface thereof opposite to the side surface facing the light conductive plate, an optical path conversion means of one light conductive bar disposed farthest from the light conductive plate is formed such that a plurality of grooves are connected to one another via each of a plurality of flat portions, which are substantially parallel to the side surface facing the light conductive plate, and the shape combining the plurality of light conductive bars and the light conductive plate substrate is generally rectangular.

According to a seventh aspect of the present invention, in the spread illuminating apparatus of the fifth or sixth aspect, preferably, the plurality of light conductive bars are arranged in parallel such that the end surface with a large thickness and the other end surface with a small thickness are set alternately on the same side.

According to an eighth aspect of the present invention, in the spread illuminating apparatus of the fifth to seventh aspects, preferably, even-number pieces of lamps are arranged in parallel, and the light conductive plate is rectangular.

According to a ninth aspect of the present invention, in the spread illuminating apparatus of the fifth to seventh aspects, preferably, odd-number pieces of lamps are arranged in parallel, the light conductive plate has an inclination angle, which is an obtuse angle formed by the end surface facing the light conductive bar with respect to a side surface flush with the end surface of the light conductive bar positioned closest to the end surface of the light conductive plate, and the light conductive bar has an inclination angle, which is an acute angle formed by the side surface facing the light conductive plate with respect to the end surface facing the spot-like light source.

DESCRIPTION OF THE PREFERRED EMBODIMENTS

Figure 9:
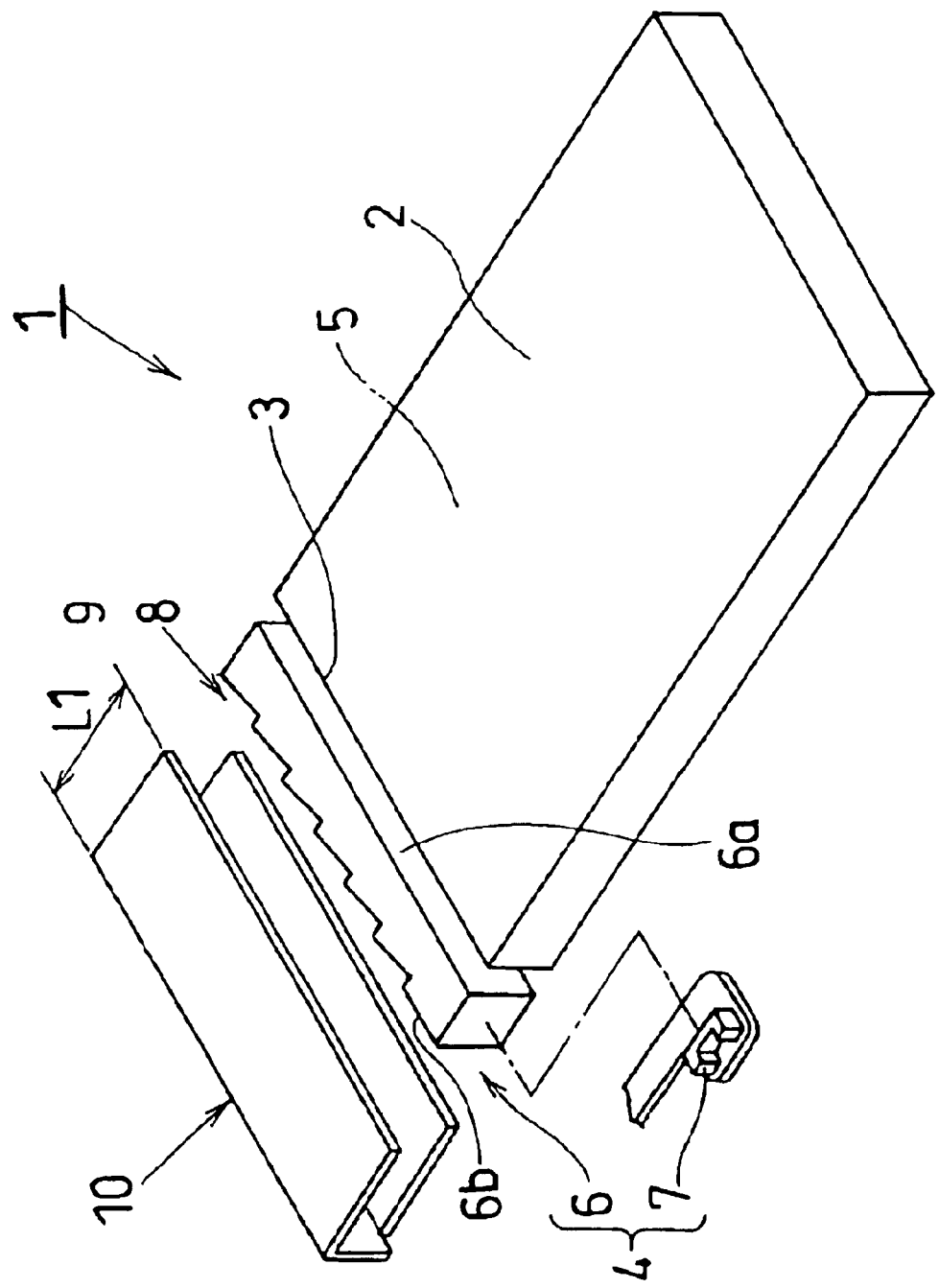
FIG. 9 is an exploded perspective view showing an example of a conventional spread illuminating apparatus.
Figure 10:
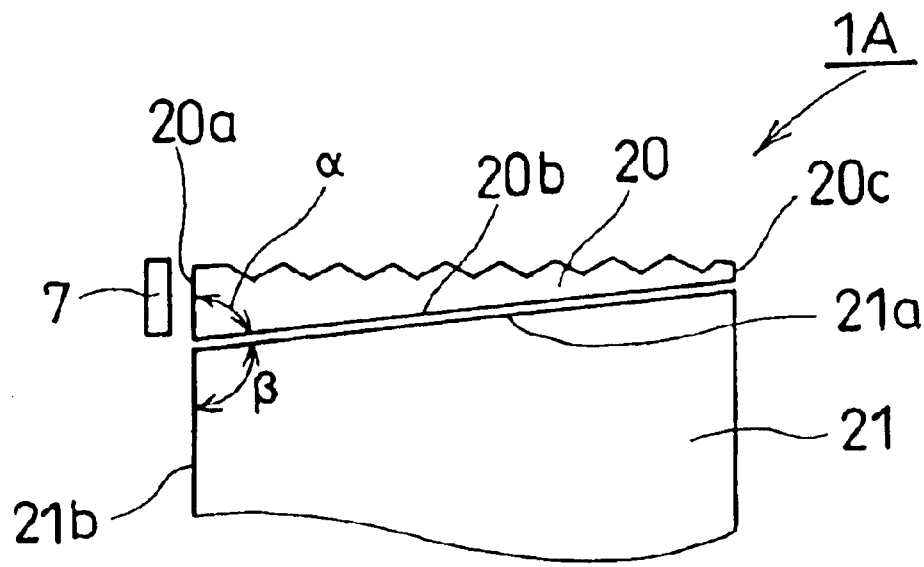
FIG. 10 is a schematic plan view showing another example of a conventional spread illuminating apparatus, in which a wedge-shaped light conductive bar is provided.
Figure 11:
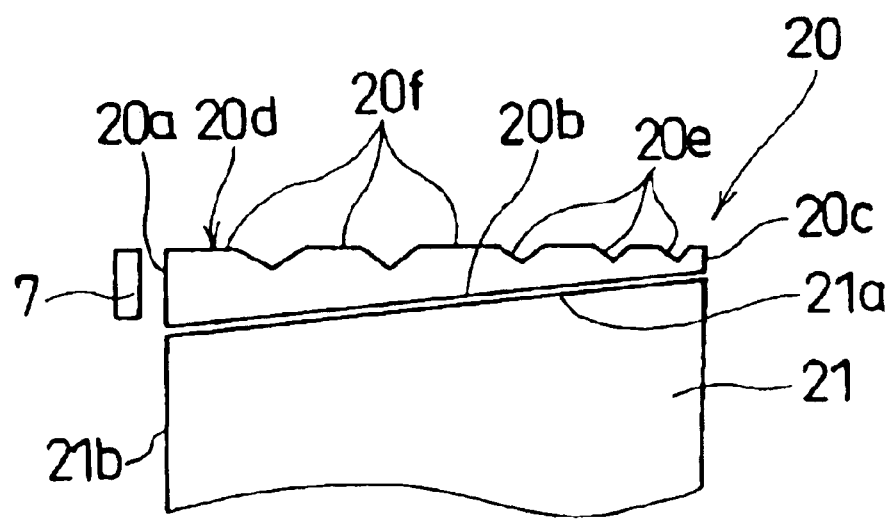
FIG. 11 is a schematic plan view showing still another example of a conventional spread illuminating apparatus, in which a light conductive bar having flat portions formed thereon is provided.
Figure 12:
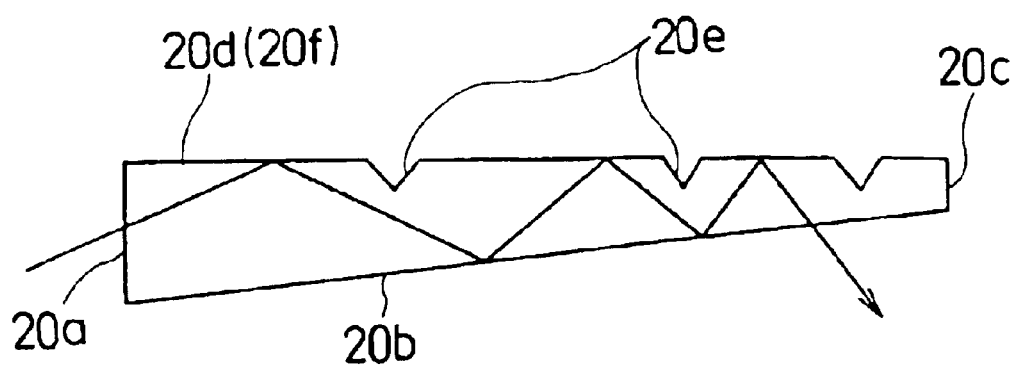
FIG. 12 is a schematic plan view of an optical path of the light conductive bar of FIG. 11.
Figure 13:
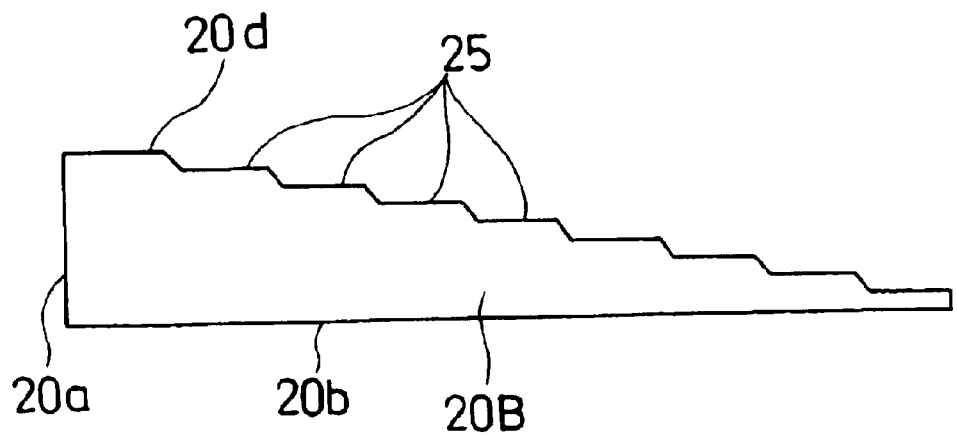
FIG. 13 is a schematic view of further conventional example.

A spread illuminating apparatus ID according to a first embodiment of the present invention will be described with reference to FIGS. 1 to 3. Elements similar to those shown in FIGS. 9 to 11 are denoted by the same reference numerals and a description thereof will be omitted as appropriate.

Figure 1:
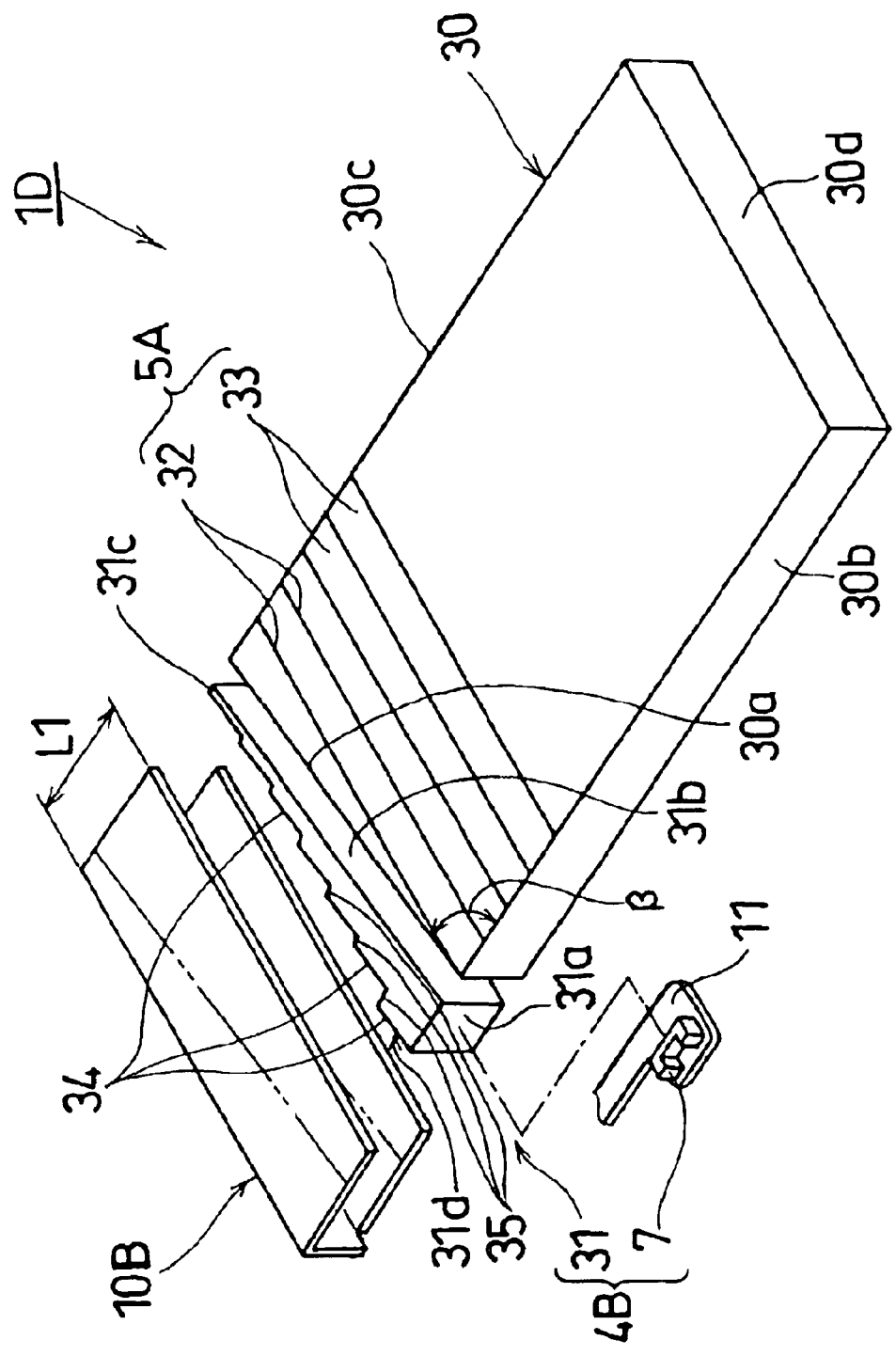
FIG. 1 is an exploded perspective view of a spread illuminating apparatus according to a first embodiment of the present invention.
Figure 2:
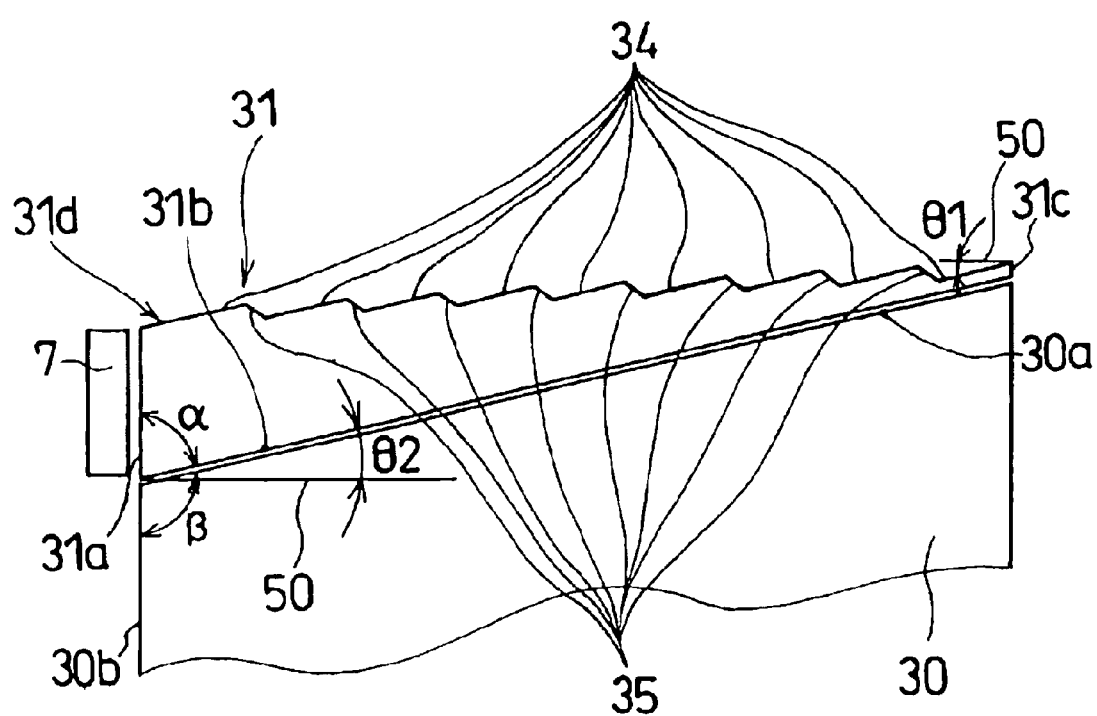
FIG. 2 is a schematic plan view of the spread illuminating apparatus of FIG. 1.

In FIGS. 1 and 2, the spread illuminating apparatus ID generally comprises a rectangular transparent substrate 30 made of a light-transmissible material, a lamp 4B arranged along an end surface 30a of the light conductive plate 30, and a frame 10B made of a metallic material such as stainless substantially U-shaped in section and having a predetermined wall thickness, an appropriate rigidity, and an appropriate spring property, and is disposed over, for example, an observation surface of a reflection-type liquid crystal element (not shown) so as to be used as a supplementary illuminator. The lamp 4B generally comprises a wedge-shaped light conductive bar 31 made of a light-transmissible material, and a spot-like light source 7 composed of a light emitting diode and disposed at an end surface 31a of the light conductive bar 31. The spot-like light source 7 is mounted on a flexible printed circuit (FPC) 11.

The light conductive plate 30 is trapezoid-shaped with a side at a side surface 30b being shorter than a side at a side surface 30c opposite to the side surface 30b, and has an inclination angle (hereinafter referred to as "light conductive plate inclination angle") β, which is an obtuse angle formed by the end surface 30a facing the light conductive bar 31 with respect to the side surface 30b flush with the end surface 31a of the light conductive bar 31.

The light conductive plate inclination angle β and a light conductive bar inclination angle α, which will be described later, are supplementary to each other (α+β=180°). Therefore, when the light conductive bar 31 is brought into contact with the light conductive plate 30 such that the side surface 31b of the light conductive bar 31 faces the end surface 30a of the light conductive plate 30, the side surface 30b of the light conductive plate 30 is flush with (shares a single plane with) the end surface 31a of the light conductive bar 31 as shown in FIG. 2, and the whole shape combining the substantially trapezoidal light conductive plate 30 and the wedge-shaped light conductive bar 31 is substantially rectangular.

The light conductive plate 30 has a light reflection pattern 5A formed on a major surface thereof. The light reflection pattern 5A comprises a plurality of grooves 32 shaped substantially triangular in section and a plurality of flat portions 33 each present between adjacent grooves 32. The plurality of grooves 32 extend in parallel to an optical axis of the lamp 4B, that is, perpendicularly to the side surface 30b from the end surface 30a of the light conductive plate 30 toward the other end surface 30d opposite to the end surface 30a. The grooves 32 have their depths set to increase in proportion to the increase in the distance from the end surface 30a of the light conductive plate 30. The light reflection pattern may be formed of grooves only, and may not necessarily be parallel to the optical axis but may be inclined in order to reduce moiré fringes.

The light conductive bar 31 is wedge-shaped so that a side at the end surface 31a facing the spot-like light source 7 is long and a side at the other end surface 31c is short. Moreover, the light conductive bar inclination angle α made by the side surface 31b facing the light conductive plate 30 with respect to the end surface 31a is an acute angle and supplementary to the light conductive plate inclination angle β, as described above. The light conductive plate 30 and the light conductive bar 31 are arranged to be in contact with each other so that the side surface 31b of the light conductive bar 31 is parallel to the end surface 30a of the light conductive plate 30.

A plurality of flat portions 34 parallel to the surface 31b are formed on a side surface 31d of the light conductive bar 31 opposite to the side surface 31b and connected to one another via each of inclined surfaces 35 which are going down from the end surface 31a side toward the other end surface 31c, thereby forming a stair-like configuration with the flat portions 34 gradually stepping down from the end surface 31a to the other end surface 31c. As described above, the flat portions 34 are parallel to the side surface 31b as shown in FIG. 3, and are configured in such a manner that the absolute value of a difference between an angle θ1 formed by the flat portions 34 to a reference surface 50 of the light conductive bar 31 perpendicular to the end surface 31a and an angle θ2 formed by the side surface 31b to the reference surface 50 (|θ2−θ1|) is 0° (that is, the angle θ1 equals to the angle θ2).

The inclined planes 35 are configured such that light emitted from the spot-like light source 7 introduced into the light conductive bar 31 is reflected toward the side surface 31b facing the light conductive plate 30 and is incident in a substantially uniform manner on the end surface 30a of the light conductive plate 30. Since the flat portions 34 are parallel to the side surface 31b, when the light is repeatedly reflected at the side surface 31b and the flat portions 34 and forwarded up to the end surface 31c, the angles of reflections formed at the side surface 31b and the flat portions 34 stay larger than the critical angle. Therefore, light not reflected at the inclined surfaces 35 can be forwarded all the way to the end surface 31c, that is, kept in the light conductive bar 30, thereby improving the luminance of the apparatus.

Figure 3:
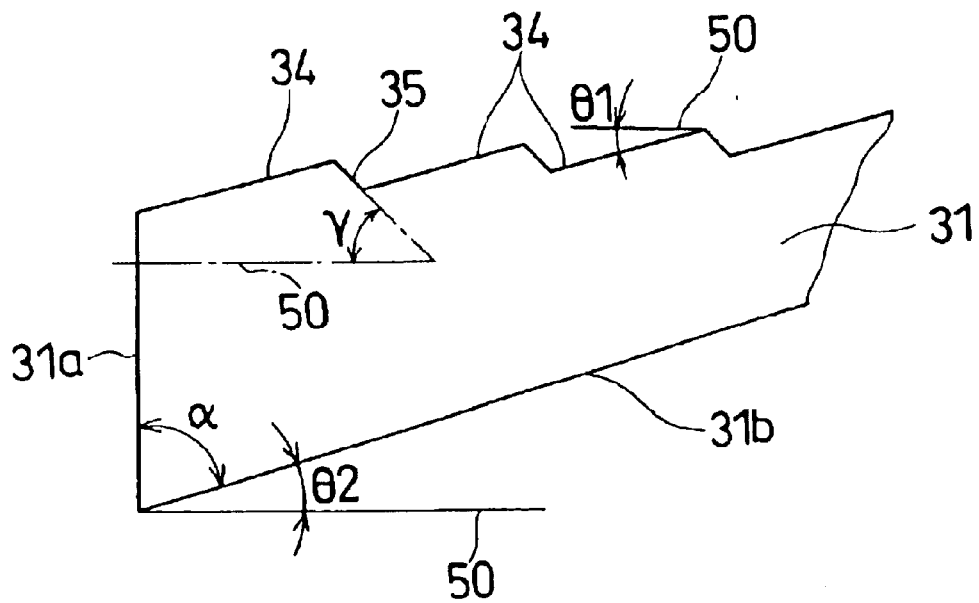
FIG. 3 is a view showing the angle of each part of a light conductive bar of FIG. 1.

An angle γ formed by the inclined surface 35 to the reference surface 50 is set to range from 45° to 55°, as shown in FIG. 3. The angle γ may be set to range from 40° to 60°.

The light conductive plate 30 has the inclination angle β, which is an obtuse angle formed by the end surface 30a facing the light conductive bar 31 to the side surface 30b flush with the end surface 31a of the light conductive bar 31 facing the spot-like light source 7, and is trapezoid-shaped such the side surface 30b is shorter than the side surface 30c opposite to the side surface 30b. The light conductive bar 31 is wedge-shaped, has a large thickness toward the side surface 31a and small thickness toward the end surface 31c opposite to the end surface 31a, and has the light conductive bar inclination angle α, which is an acute angle. Therefore, when the side surface 31b of the light conductive bar 31 is arranged to interface with the end surface 30a of the light conductive plate 30, the shape combining the light conductive bar 31 and the light conductive plate 30 is substantially rectangular.

As a result, the side surface 31d of the light conductive bar 31 is prevented from being positioned far away from the light conductive plate 30, so even when the width of the frame 10B is decreased, the frame 10B sufficiently covers the light conductive plate 30 at the portion toward the end surface 31c of the light conductive bar 31. Accordingly, the light conductive bar 31 and the light conductive plate 30 can be held together with an increased strength. This is effective in increasing the display screen area while keeping the apparatus compact.

In this embodiment, the light conductive bar inclination angle α and the light conductive plate inclination angle β are supplementary to each other. Accordingly, the shape combining the light conductive member 31 and the transparent substrate 30 can be rectangular, thereby making the apparatus more compact.

Figure 4:
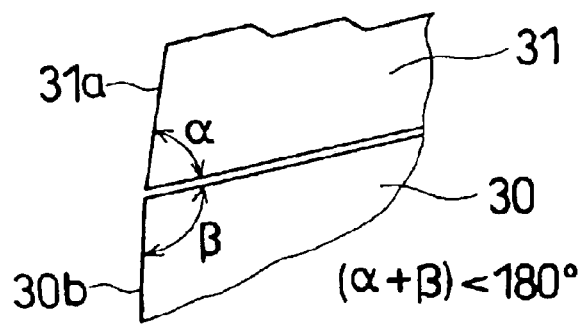
FIG. 4 is a schematic view of one example of a second embodiment of the present invention, in which a light conductive bar inclination angle and light conductive plate inclination angle are not supplementary to each other.

Also, in this embodiment, the light conductive bar inclination angle α and the light conductive plate inclination angle β are supplementary (α+β=180°) and the end surface 31a is flush with the side surface 30b of the light conductive plate 30 as shown in FIG. 2, but the invention is not limited thereto. For example, the value of (α+β) may be smaller than 180° [(α+β)<180°] (a second embodiment as shown in FIG. 4), and may also be larger than 180° [(α+β)>180°].

Figure 5:
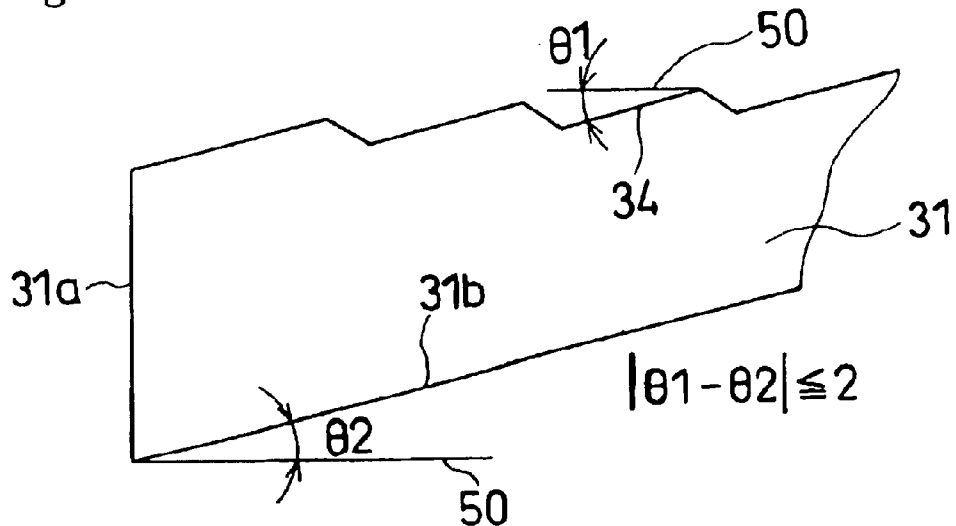
FIG. 5 is a schematic view of a third embodiment of the present invention, in which the absolute value of the difference between the angle formed by flat portions of an optical path conversion means to the reference surface and the angle formed by a surface of a light conductive bar facing a light conductive plate to the reference surface is set to 2° or less.

In the above embodiment, the flat portions 34 are formed in parallel to the side surface 31b facing the light conductive plate 30, but may alternatively be configured to be "substantially" parallel thereto, for example, such that the absolute value of the difference between the angle θ1 formed by the flat portions 34 to the reference surface 50 and the angle θ2 formed by the side surface 31b to the reference surface 50 (|θ2−θ1|) is 2° or less (a third embodiment) as shown in FIG. 5. The difference between the angle θ1 and the angle θ2 is preferably 1° or less.

A spread illuminating apparatus 1E according to a fourth embodiment of the present invention will be described with reference to FIG. 6 together with FIGS. 1 and 2. The spread illuminating apparatus 1E is principally different from the spread illuminating apparatus 1D (refer to FIGS. 1 to 3) in that a light conductive bar 31A having a plurality of grooves 40 and a plurality of flat portions 34A each connecting adjacent grooves 40 formed on a side surface 31d opposite a side surface 31b facing the light conductive plate 30 is provided in place of the light conductive bar 31 having the flat portions 34 and the inclined surfaces 35 formed on the side surface 31d, and in that a lamp 4E comprising a light conductive bar 31A and a spot-like light source 7 is provided in place of the lamp 4B comprising light conductive bar 31 and the spot-like light source 7.

The plurality of flat portions 34A of the light conductive bar 31A are formed in parallel to the side surface 31b, and gradually step down with respect to the side surface 31b from an end surface 31a to the other end surface 31c (that is, the distance H between the side surface 31b and respective flat portions 34A decreases).

In the fourth embodiment, since the flat portions 34A are parallel to the side surface 31b, the angles of reflections at the side surface 31b and the flat portions 34A stay larger than the critical angle when light travels toward the end surface 31c in a manner similar to the first embodiment. Accordingly, the light not reflected at the grooves 40 can travel up to the end surface 31c, thereby increasing the luminance of the apparatus.

Moreover, the light conductive bar 31A is wedge-shaped, and has a large thickness toward the end surface 31a facing the spot-like light source 7 and a small thickness toward the end surface 31c, and the light conductive bar inclination angle α is acute. Therefore, when the side surface 31b of the light conductive bar 31A is arranged to interface with the end surface 30a of the light conductive plate 30, the shape combining the light conductive bar 31A and the light conductive plate 30 is substantially rectangular. Accordingly, the apparatus can be miniaturized as is the first embodiment.

In this connection, the first embodiment has a low degree of flexibility in design, and when the light conductive bar inclination angle α and the length (the depth of each of the grooves) of the inclined surfaces 35 are limited to fixed values, the pitch of the stair-like grooves cannot be set to an arbitrary value. Also, when the pitch of the stair-like grooves and the depth of the grooves are limited to fixed values, the light conductive bar inclination angle a cannot be set to an arbitrary value. On the other hand, in the fourth embodiment, since the plurality of grooves 40 and a plurality of flat portions 34A are formed, the distance H between the side surface 31b and the flat portions 34A can be set to an arbitrary value, and as a result, the pitch of the grooves 40 and the light conductive bar inclination angle α can be independently controlled. Particularly, when the light conductive bar is long, this embodiment can be very advantageous.

Subsequently, a spread illuminating apparatus 1F according to a fifth embodiment of the present invention will be described with reference to FIG. 7 together with FIGS. 1 and 2. The spread illuminating apparatus 1F is principally different in that it includes a rectangular light conductive plate 30B in place of the substantially trapezoidal light conductive plate 30, a lamp 4F comprising a substantially wedge-shaped light conductive bar 31B and a spot-like light source 7 is provided between the rectangular light conductive plate 30B and the lamp 4B comprising the light conductive bar 31 and the spot-like light source 7, and that the light conductive bar 31 of the lamp 4B and the light conductive bar 31B of the lamp 4F are arranged in parallel to each other along the end surface 30a of the light conductive plate 30B.

The end surface 31a (one end surface) of the light conductive bar 31 facing the spot-like light source is arranged toward the side surface 30b of the light conductive plate 30B, and the surface 31a (one end surface) of the light conductive bar 31B is arranged toward the side surface 30c of the light conductive plate 30B. Accordingly, the end surface 31c (the other end surface) of the light conductive bar 31B and the end surface 31a (one end surface) of the light conductive bar 31 are arranged toward the side surface 30b of the light conductive plate 30B, so that the light conductive bar 31 and 31B are arranged in parallel such that one end surface and the other end surface are alternately positioned toward each of both side surfaces of the light conductive plate.

The light conductive bar 31B is wedge-shaped, has a large thickness at the end surface 31a and a small thickness at the end surface 31c, has a right angle formed by the side surface 31b facing the light conductive plate 30B to the end surface 31a, and has a right angle formed by the side surface 31b to the end surface 31c. Therefore, when the end surface 30a of the light conductive plate 30B is arranged to interface with the side surface 31b of the light conductive bar 31B, the end surface 31a of the light conductive bar 31B and the side surface 30c of the light conductive plate 30B are flush with each other and the end surface 31c of the light conductive bar 31B and the side surface 30b of the light conductive plate 30B are flush with each other.

The side surface 31d of the light conductive bar 31B opposite to the side surface 31b has the flat portions 34A which are parallel to the side surface 31b and which are connected to one another via inclined surfaces 35A descending toward the end surface 31c in such a manner as to gradually step down from the end surface 31a toward the other end surface 31c. An angle K1 formed by the surface 31d to the end surface 31c is set to a value (equal to the angle β) supplementary to the light conductive bar inclination angle α. Accordingly, when the light conductive bar 31B is arranged along the light conductive plate 30D such that the side surface 31b interfaces with the end surface 30a, the shape combining the light conductive bar 31B and the light conductive plate 30B is substantially similar to that of the light conductive plate 30 of the first embodiment.

The inclined surfaces 35A are formed such that light emitted from the spot-like light source 7 strikes the inclined surfaces 35A and reflected toward the side surface 31b facing the light conductive plate 30B, whereby the light can be spread and incident in a substantially uniform manner on the end surface 30a of the light conductive plate 30B. In this embodiment, one optical path conversion means is formed on the light conductive bar 31B and comprise the flat portions 34A and the inclined surfaces 35A, and another optical path conversion means is formed on the light conductive bar 31 and comprises the flat portions 34 and the inclined surface 35.

Since the flat portions 34A are parallel to the side surface 31b facing the light conductive plate 30B, the angles of reflections at the surface 31b and the flat portions 34A stay larger than the critical angle when the light introduced into the light conductive bar 31B is repeatedly reflected at the side surface 31b and the flat portions 34A and travels up the end surface 31c. Accordingly, the light not reflected at the inclined surfaces 35A can travel up to the end surface 31c, thereby increasing the luminance of the apparatus.

With the angles of the members as described above, when the side surface 31b of the light conductive bar 31B is arranged to interface with the end surface 30a of the light conductive plate 30B and when the side surface 31b of the light conductive bar 31 is arranged to interface with the side surface 31d of the light conductive bar 31B opposite to the side surface 31b facing the light conductive plate 30B, the shape combining the light conductive bar 31, the light conductive bar 31B, and the light conductive plate 30B is substantially rectangular. This eliminates portions projecting partially, thereby miniaturizing the apparatus.

In the fifth embodiment, the light conductive bar inclination angle α and the angle K1 (equal to the angle β) are supplementary to each other. Therefore, the shape combining the light conductive bar 31, the light conductive bar 31B, and the light conductive plate 30B can be rectangular, thereby making the apparatus further compact.

In the fifth embodiment, while the flat portions 34 are formed exactly parallel to the side surface 31b facing the light conductive plate 30B, they may be substantially parallel to each other. Specifically, the absolute value of a difference between the angle θ1 (refer to FIG. 2) formed by the flat portions 34 to the reference surface 50 (refer to FIG. 2) and the angle θ2 (refer to FIG. 2) formed by the side surface 31b to the reference surface 50 (|θ2−θ1|) may be set to 2° or less in the same manner as in the first embodiment. The difference between the angle θ1 and the angle θ2 is preferably 1° or less.

In the fifth embodiment, both optical path conversion means of the light conductive bars 31 and 31B comprise flat portions and inclined surfaces, specifically the optical path conversion means of the light conductive bar 31 comprises the flat portions 34 and the inclined surfaces 35, and the optical path conversion means of the light conductive bar 31B comprises the flat portions 34A and the inclined planes 35A. But, only one of the optical path conversion means of the light conductive bar 31 and 31B may comprise flat portions and inclined surfaces.

Figure 6:
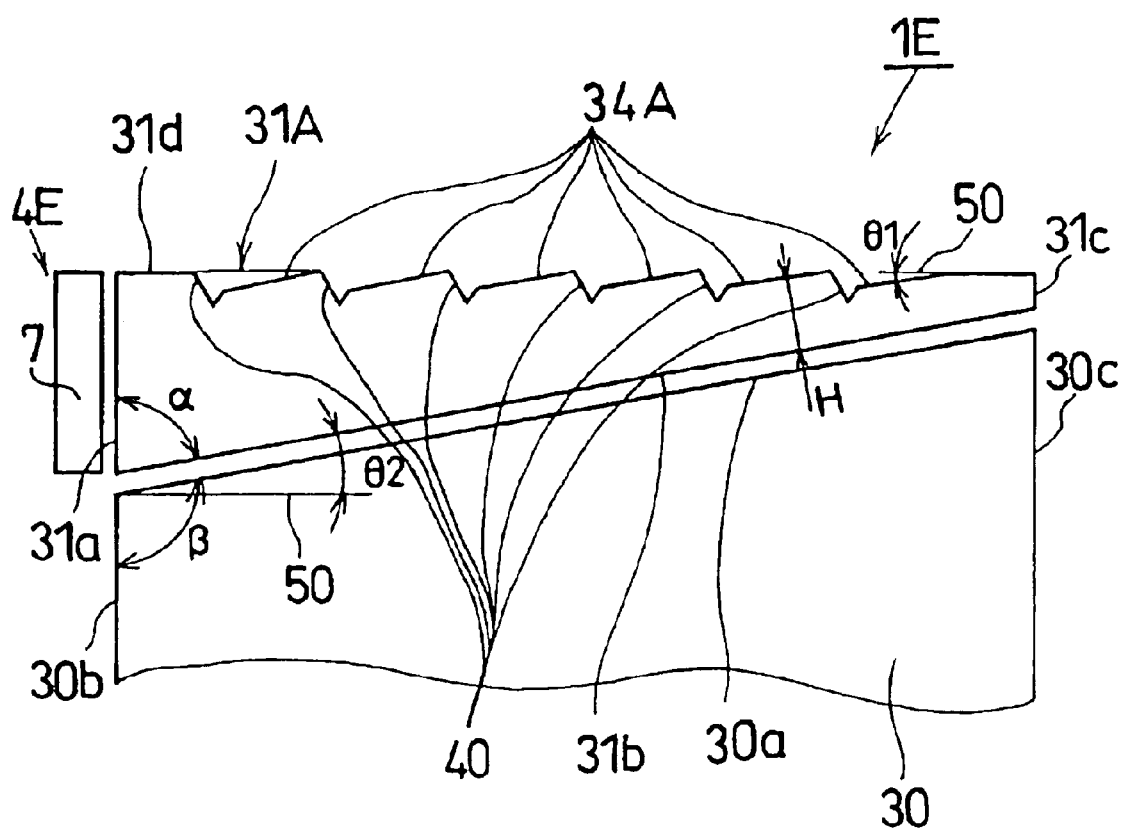
FIG. 6 is a schematic plan view of a fourth embodiment of the present invention, in which a light conductive bar is provided.
Figure 7:
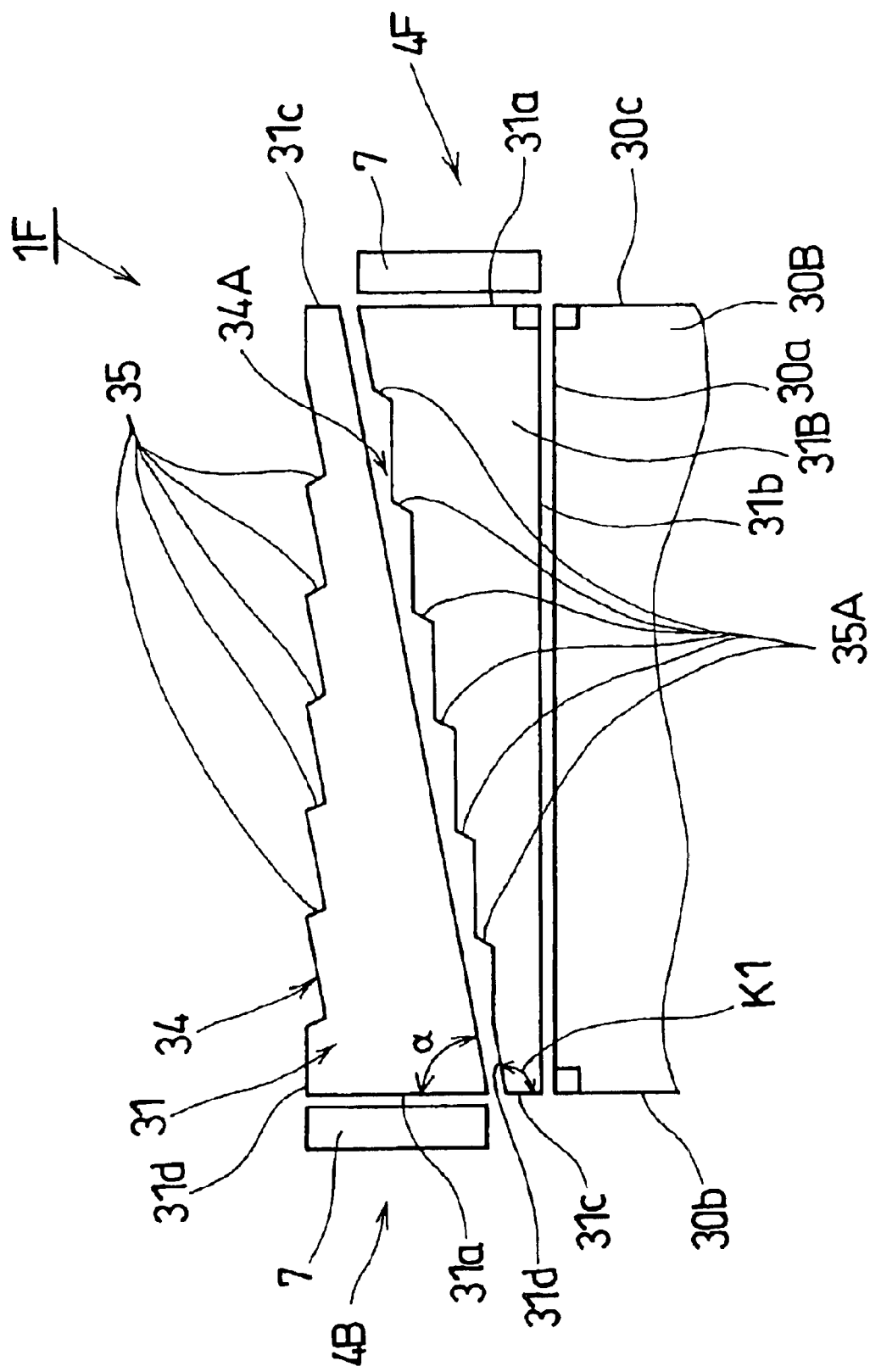
FIG. 7 is a schematic plan view of a fifth embodiment of the present invention, in which two light conductive bars are provided.

Moreover, in FIG. 7, the light conductive bar 31 may alternatively comprise a plurality of grooves 40 and a plurality of flat portions 34A each connecting adjacent grooves 40 formed on the side surface 31$d$ in the same manner as the fourth embodiment (FIG. 6). Also, in FIG. 7, the light conductive member 31B may alternatively comprise a plurality of grooves 40 and a plurality of flat portions 34A each connecting adjacent grooves 40 formed on the side surface 31$d$ in the same manner as the light conductive member 31 (FIG. 6).

Also, in the fifth embodiment, the two light conductive bars 31 and 31B are arranged in parallel along the end surface 30$a$ of the rectangular light conductive plate 30B, but even-number pieces of light conductive bars configured similar to the light conductive members 31 and 31B may be arranged in parallel to the light conductive bars 31 and 31B along the end surface of the rectangular light conductive plate.

Figure 8:
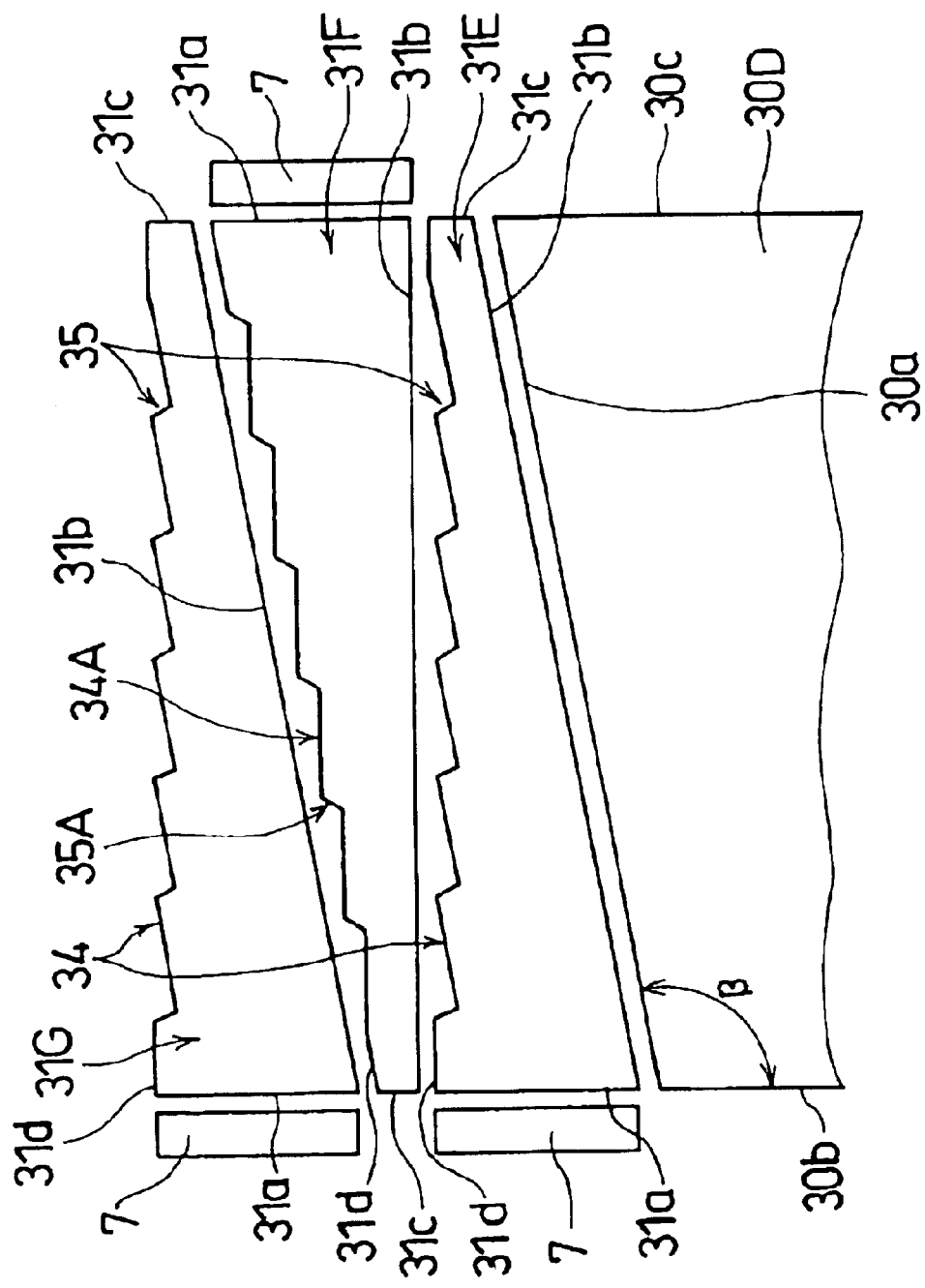
FIG. 8 is a schematic plan view of a sixth embodiment of the present invention, in which three light conductive bars are provided.

Also, in the fifth embodiment, the two light conductive bars 31 and 31B are arranged in parallel along the end surface of the rectangular light conductive plate. Alternatively, as shown in FIG. 8, three light conductive members 31E, 31F, and 31G formed substantially similar to the light conductive members 31 and 31B including the optical path conversion means may be arranged in parallel to an end surface 30$a$ of substantially trapezoidal light conductive plate 30D similar to the light conductive plate 30 shown in FIG. 1 (a sixth embodiment).

Also in the sixth embodiment, the shape combo the light conductive bars 31E, 31F, and 31G and the light conductive bar 30D is substantially rectangular, thereby miniaturizing the apparatus. Also, since the light conductive bars 31E, 31F, and 31G each include an optical path conversion means equal to those of the light conductive members 31 and 31B, light introduced into the light conductive bars 31E, 31F, and 31G travels up to an end surface 31$c$, thereby increasing the luminance of the apparatus.

In the sixth embodiment, the three light conductive bars 31E, 31F, and 31G are arranged in parallel along the end surface 30$a$ of the substantially trapezoidal light conductive plate 30D, but even-number pieces of light conductive bars configured similar respectively to the light conductive bars 31E and 31F may be arranged in parallel to the light conductive bars 31E, 31F, and 31G, so that five or more odd-number pieces of light conductive bars may be arranged in parallel along the end surface of the substantially trapezoidal light conductive plate.

In the above embodiments, although a light-emitting diode is used as the spot-like light source 7, the present invention is not limited to that, and a spot-like light source which can be lit on at a relatively low voltage, such as an incandescent lamp, may alternatively be used.

According to die present invention, on a side surface of the light conductive bar opposite to a side surface facing the light conductive plate, a plurality of flat portions are formed substantially parallel to the side surface facing the light conductive plate, and connected to one another via inclined surfaces descending toward the other end surface whereby the flat portions gradually step sown with respect to the side surface facing the light conductive plate from the end surface toward the other end surface. Accordingly, light introduced into the light conductive bar through the end surface is repeatedly reflected at the side surface facing the light conductive plate and the flat portions with the angles of reflections staying larger than the critical angle. Therefore, the light can be forwarded up to the other end surface, unless reflected at the inclined surfaces, thereby increasing the luminance of the apparatus.

The light conductive plate has an inclination angle, which is an obtuse angle formed by the end surface facing the light conductive bar with respect to the side surface flush with the end surface of the light conductive bar facing the spot-like light source. The light conductive bar is wedge-shaped, and has a large thickness toward the end surface facing the spot-like light source and a small thickness toward the other end surface opposite to the end surface facing the spot-like light source, and has an inclination angle, which is an acute angle formed by the side surface facing the light conductive plate with respect to the end surface facing the spot-like light source. Accordingly, when the side surface of the light conductive bar is arranged to interface with the end surface of the light conductive plate, the shape combining the light conductive bar and the light conductive plate is substantially rectangular, so that projection can be minimized, thereby simplifying the apparatus.

Also, the frame shaped substantially U-letter in section can securely hold together the light conductive bar and the light conductive plate at the portion toward the other end surface of the light conductive bar even if the width of the frame is decreased, thereby increasing the display screen area, making it possible to miniaturize the apparatus.

According to the present invention, a plurality of grooves and a plurality of flat portions each connecting adjacent grooves are formed on a side surface of the light conductive bar opposite to a side surface facing the light conductive plate, and the flat portions are substantially parallel to the side surface facing the light conductive plate. Accordingly, when light introduced into the light conductive bar through the end surface is repeatedly reflected at the side surface facing the light conductive plate and the flat portions with the angles of reflections staying larger than the critical angle. Therefore, the light can be forwarded up to the other end surface, unless reflected at the grooves, thereby increasing the luminance of the apparatus.

Moreover, since the plurality of grooves and the plurality of flat portions are formed on the side surface of the light conductive bar opposite to the side surface facing the light conductive plate, the pitch of the grooves and the inclination angle α on the light conductive bar can be set to arbitrary values, thereby facilitating the utilization of a long light conductive bar.

In a manner similar to the aforementioned aspect of the invention, the light conductive plate has an inclination angle, which is an obtuse angle formed by the end surface facing the light conductive bar to the side surface flush with the end surface of the light conductive bar facing the spot-like light source, and the light conductive bar is wedge-shaped, has a large thickness toward the end surface facing the spot-like light source and a small thickness toward the other end surface, and has an inclination angle, which is an acute angle formed by the side surface facing the light conductive bar to the end surface facing the spot-like light source. Accordingly, when the side surface of the light conductive bar is arranged to interface with the end surface of the light conductive plate, the shape combining the light conductive bar and the light conductive plate is generally rectangular, so that projection can be minted, thereby simplifying the apparatus.

According to the present invention, the angle formed by the side surface of the light conductive bar facing the light conductive plate to the end surface of the light conductive bar and the inclination angle of the light conductive plate are supplementary to each other. Thus, the end surface of the light conductive bar facing the spot-like light source and the side surface of the light conductive plate are arranged to be flush with each other and the shape combining the light conductive bar and the light conductive plate is generally rectangular, thereby simplifying the configuration.

What is claimed is:

1. A spread illuminating apparatus comprising:
   a quadrangular light conductive plate made of a light-transmissible material; and
   a lamp including a light conductive bar made of a transparent material and arranged along an end surface of said light conductive plate, and a spot-like light source arranged at an end surface of said light conductive bar,
   wherein said light conductive plate has an inclination angle, which is an obtuse angle formed by said end surface facing said conductive bar with respect to a side surface flush with said end surface of said light conductive bar;
   wherein said light conductive bar is wedge-shaped, has a large thickness toward said end surface and a small thickness toward the other end surface opposite to said end surface, and has an inclination angle, which is an acute angle formed by side surface facing said light conductive plate with respect to said end surface; and
   wherein a plurality of flat portions substantially parallel to said side surface facing said light conductive plate are formed on a side surface of said light conductive bar opposite to said side surface facing said light conductive plate, are connected to one another via each of a plurality of inclined surfaces descending toward said other end surface, and gradually step down with respect to said side surface facing said light conductive plate from said end surface toward said other end surface, forming a stair-like configuration.

2. A spread illuminating apparatus comprising:
   a quadrangular light conductive plate made of a light-transmissible material; and
   a lamp including a light conductive bar made of a transparent material and arranged along an end surface of said light conductive plate, and a spot-like light source arranged at an end surface of said light conductive bar,
   wherein said light conductive plate has an inclination angle, which is an obtuse angle formed by said end surface facing said light conductive bar with respect to a side surface flush with said end surface of said light conductive bar;
   wherein said light conductive bar is wedge-shaped, has a large thickness toward said end surface and a small thickness toward the other end surface opposite to said end surface, has an inclination angle, which is an acute angle formed by a side surface facing said light conductive plate with respect to said end surface, and has a plurality of grooves and a plurality of flat portions formed on a side surface thereof opposite to said side surface facing said light conductive plate, such that said plurality of flat portions are substantially parallel to said side surface facing said light conductive plate and each connect adjacent grooves.

3. A spread illuminating apparatus as claimed in claim 1, wherein an absolute value of a difference between an angle formed by said side surface of said light conductive bar facing said light conductive plate to a predetermined reference plane and an angle formed by said flat portions to said reference plane is 2° or less, more preferably 1° or less.

4. A spread illuminating apparatus as claimed in claim 1, wherein an angle formed by said side surface of said light conductive bar facing said light conductive bar with respect to said end surface is supplementary to said inclination angle of said light conductive plate.

5. A spread illuminating apparatus comprising:
   a quadrangular light conductive plate made of a light-transmissible material; and
   a plurality of lamps each including a light conductive bar made of a transparent material and arranged in parallel along an end surface of said light conductive plate, and a spot-like light source arranged at an end surface of said light conductive bar,
   wherein each of a plurality of light conductive bars is wedge-shaped, has a large thickness toward said end surface and a small thickness toward said the other end surface opposite to said end surface, and has an optical path conversion means formed on a side surface thereof opposite to said side surface facing said light conductive plate;
   wherein an optical path conversion means of one light conductive bar disposed farthest from said light conductive plate is formed such that a plurality of flat portions substantially parallel to said side surface facing said light conductive plate are connected to one another via each of a plurality of inclined surfaces descending toward said the other end surface so that said plurality of flat portions gradually step down with respect to said side surface facing said light conductive plate from said end surface toward said other end surface, thereby forming a stair-like configuration; and
   wherein a shape combining said plurality of light conductive bars and said light conductive plate is generally rectangular.

6. A spread illuminating apparatus comprising:
   a quadrangular light conductive plate made of a light-transmissible material; and
   a plurality of lamps each including a light conductive bar made of a transparent material and arranged in parallel along an end surface of said light conductive plate, and a spot-like light source arranged at an end surface of said light conductive bar,
   wherein each of a plurality of light conductive bars is wedge-shaped, has a large thickness toward said end surface and a small thickness toward the other end surface opposite to said end surface, and has an optical path conversion means formed on a side surface thereof opposite to said side surface facing said light conductive plate;
   wherein a shape combining said plurality of light conductive bars and said light conductive plate is generally rectangular; and
   wherein an optical path conversion means of one light conductive bar disposed farthest from the light conductive plate is formed such that a plurality of grooves are connected to one another via each of a plurality of flat portions, which are substantially parallel to said side surface facing said light conductive plate.

7. A spread illuminating apparatus as claimed in claim 5, wherein said plurality of light conductive bars are arranged in parallel such that said end surface with a large thickness and said other end surface with a small thickness are set alternately on one same side.

8. A spread illuminating apparatus as claimed in claim 5, wherein even-number pieces of lamps are arranged in parallel; and wherein said light conductive plate is rectangular.

9. A spread illuminating apparatus as claimed in claim 5, wherein odd-number pieces of lamps are arranged in parallel;

wherein said light conductive plate has an inclination angle, which is an obtuse angle formed by said end surface facing said light conductive bar with respect to a side surface flush with said end surface of said light conductive bar positioned closest to said end surface of said light conductive plate; and wherein said light conductive bar has an inclination angle, which is an acute angle formed by said side surface said light conductive plate with respect to said end surface facing said spot-like light source.

10. A spread illuminating apparatus as claimed in claim 2, wherein an absolute value of a difference between an angle formed by said side surface of said light conductive bar facing said light conductive plate to a predetermined reference plane and an angle formed by said flat portions to said reference plane is 2° or less, more preferably 1° or less.

11. A spread illuminating apparatus as claimed in claim 2, wherein an angle formed by said side surface of said light conductive bar facing said light conductive bar with respect to said end surface is supplementary to said inclination angle of said light conductive plate.

12. A spread illuminating apparatus as claimed in claim 3, wherein an angle formed by said side surface of said light conductive bar facing said light conductive bar with respect to said end surface is supplementary to said inclination angle of said light conductive plate.

13. A spread illuminating apparatus as claimed in claim 6, wherein said plurality of light conductive bars are arranged in parallel such that said end surface with a large thickness and said other end surface with a small thickness are set alternately on one same side.

14. A spread illuminating apparatus as claimed in claim 6, wherein even-number pieces of lamps are arranged in parallel; and wherein said light conductive plate is rectangular.

15. A spread illuminating apparatus as claimed in claim 7, wherein even-number pieces of lamps are arranged in parallel; and wherein said light conductive plate is rectangular.

16. A spread illuminating apparatus as claimed in claim 6, wherein odd-number pieces of lamps are arranged in parallel;

wherein said light conductive plate has an inclination angle, which is an obtuse angle formed by said end surface facing said light conductive bar with respect to a side surface flush with said end surface of said light conductive bar positioned closest to said end surface of said light conductive plate; and wherein said light conductive bar has an inclination angle, which is an acute angle formed by said side surface said light conductive plate with respect to said end surface facing said spot-like light source.

17. A spread illuminating apparatus as claimed in claim 7, wherein odd-number pieces of lamps are arranged in parallel;

wherein said light conductive plate has an inclination angle, which is an obtuse angle formed by said end surface facing said light conductive bar with respect to a side surface flush with said end surface of said light conductive bar positioned closest to said end surface of said light conductive plate; and wherein said light conductive bar has an inclination angle, which is an acute angle formed by said side surface said light conductive plate with respect to said end surface facing said spot-like light source.

* * * * *